(12) United States Patent
Noguchi et al.

(10) Patent No.: US 7,561,365 B2
(45) Date of Patent: Jul. 14, 2009

(54) DISK DRIVE AND CONTROL METHOD THEREOF

(75) Inventors: Masaaki Noguchi, Kanagawa (JP); Tetsuo Ueda, Kanagawa (JP); Gaku Ikedo, Kanagawa (JP); Mirei Hosono, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 288 days.

(21) Appl. No.: 11/527,899

(22) Filed: Sep. 26, 2006

(65) Prior Publication Data

US 2007/0070540 A1 Mar. 29, 2007

(30) Foreign Application Priority Data

Sep. 27, 2005 (JP) ............................. 2005-279630

(51) Int. Cl.
*G11B 21/02* (2006.01)

(52) U.S. Cl. ......................................................... 360/75

(58) Field of Classification Search .................. 360/75, 360/77.02, 77.08, 78.04, 77.03, 77.07, 78.05, 360/78.14, 31, 73.03, 294.4; 318/632; 369/44.32; 345/157

See application file for complete search history.

(56) References Cited

U.S. PATENT DOCUMENTS

| | | | | |
|---|---|---|---|---|
| 5,936,787 A * | 8/1999 | Ohmi | ....................... | 360/73.03 |
| 6,310,605 B1 * | 10/2001 | Rosenberg et al. | .......... | 345/157 |
| 6,538,839 B1 * | 3/2003 | Ryan | ....................... | 360/77.02 |
| 6,549,349 B2 * | 4/2003 | Sri-Jayantha et al. | ......... | 360/31 |
| 6,580,579 B1 | 6/2003 | Hsin et al. | | |
| 6,583,964 B1 * | 6/2003 | Huang et al. | ............. | 360/294.4 |
| 6,833,974 B2 * | 12/2004 | Koso et al. | ............... | 360/78.05 |
| 6,888,694 B2 * | 5/2005 | Guo et al. | ................. | 360/77.03 |
| 6,898,046 B2 * | 5/2005 | Sri-Jayantha et al. | ..... | 360/77.02 |
| 6,927,934 B2 * | 8/2005 | Atsumi | ..................... | 360/77.08 |
| 6,934,116 B2 * | 8/2005 | Iwashiro | ................... | 360/78.04 |
| 6,947,243 B2 * | 9/2005 | Dang et al. | .................... | 360/75 |

(Continued)

FOREIGN PATENT DOCUMENTS

JP         2001-297520      * 10/2001

(Continued)

*Primary Examiner*—Fred Tzeng
(74) *Attorney, Agent, or Firm*—Townsend and Townsend and Crew LLP; Patrick Duncan

(57) ABSTRACT

Embodiments of the present invention provide a disk drive capable of reducing, by means of simple control, vibrations applied to the drive and vibrations occurring in the drive, and a control method for controlling the disk drive. In one embodiment, a servo system comprises a sensor unit for detecting vibrations, a correction signal generator for, when the sensor unit detects vibrations, generating a correction signal, a position error signal generator for generating a PES signal on the basis of servo data read out from a disk and a target position, a servo controller for generating a servo control signal for controlling a position of a head on the basis of the PES signal, and a servo controller for generating a driving signal on the basis of the correction signal and the servo control signal. The correction signal generator includes a plurality of filters, each of which eliminates vibrations in each different frequency band, the correction signal generator selecting one or two or more RV-FF filters when vibrations are detected, and then generating a correction signal so as to reduce a position error indicated by the PES signal.

19 Claims, 10 Drawing Sheets

U.S. PATENT DOCUMENTS

| | | | |
|---|---|---|---|
| 6,950,273 B2 * | 9/2005 | Nakagawa et al. | 360/78.14 |
| 6,985,418 B2 * | 1/2006 | Hori | |
| 7,035,034 B2 * | 4/2006 | Semba et al. | 360/75 |
| 7,035,037 B2 * | 4/2006 | Tao et al. | 360/77.02 |
| 7,054,094 B2 * | 5/2006 | Zhang et al. | 360/77.02 |
| 7,141,951 B2 * | 11/2006 | Hosono et al. | 318/632 |
| 7,145,307 B2 * | 12/2006 | Hosono et al. | 318/632 |
| 7,177,113 B1 * | 2/2007 | Semba et al. | 360/77.07 |
| 7,319,570 B2 * | 1/2008 | Jia et al. | 360/77.02 |
| 2003/0218819 A1 * | 11/2003 | Sri-Jayantha et al. | |
| 2004/0213100 A1 * | 10/2004 | Iwashiro | 369/44.32 |
| 2006/0072392 A1 | 4/2006 | Semba et al. | |

FOREIGN PATENT DOCUMENTS

WO     WO01/57854 A2     8/2001

* cited by examiner

ID

DISK DRIVE AND CONTROL METHOD THEREOF

CROSS-REFERENCES TO RELATED APPLICATIONS

This application claims priority from Japanese Patent Application No. JP2005-279630, filed Sep. 27, 2005, the entire disclosure of which is incorporated herein by reference.

BACKGROUND OF THE INVENTION

The present invention relates to disk drives such as a hard disk drive (hereinafter referred to as "HDD"), and a control method thereof. In particular, the invention relates to a disk drive capable of performing positioning control of a head by means of the feedforward control and the feedback control, and a control method thereof.

Means for coping with an offtrack error caused by vibrations is indispensable for a data storage device for writing data to a rotating recording medium (hereinafter referred to as "disk drive"), such as a hard disk drive. An example in which the offtracking causes a problem is, for example, a case where while data is written, the offtracking causes data, which is written to a data track other than a target data track, to be rewritten.

In recent years, the track density increases with the increase in capacity of a recording medium. Therefore, an offtrack error tends to easily occur due to vibrations generated when a disk drive itself seeks a head, and also due to vibrations generated by adjacent disk drives in a system such as a disk array. In addition, because the larger capacity and the further speedup are being achieved, the speedup in the servo technique used for moving a head is required. Therefore, if the servo technique for head moving uses only the feedback control that drives a head on the basis of a feedback error between target information used to move the head to a target position and demodulation information into which feedback information from the head is demodulated, the delay of a driving signal becomes so large that the delay cannot be ignored with respect to the seek time. Accordingly, it is impossible to achieve high-speed move. Because of the above reason, the feedforward control is used in general. In the feedforward control, a waveform of an electric current for driving a head is stored beforehand as feedforward information, and the head is controlled with the feedforward information added to a feedback error.

Incidentally, the feedback control is a servo system that feeds back a position error signal (PES) to the positioning control of a head, wherein feedback is applied so that a value of the position error signal becomes the smallest to control positioning of the head. However, if unpredictable random vibrations occur due to an external event, there is a possibility that an offtrack error will occur. For this reason, a device is disclosed in which vibrations influencing a servo system are detected, and thereby the servo system is compensated for. More specifically, the compensation is achieved by: on the basis of a position error signal, detecting a frequency of vibrations that exert an influence upon an HDD; configuring a correction filter that is suitable for the reduction of the vibrations for the detected frequency; and correcting the feedback control by use of this correction filter. See patent document 1 (Japanese Patent Laid-Open No. 2000-048509).

On the other hand, the feedforward control, which is also called an RVS (Rotational Vibration Safeguard) system or an RV-FF (Rotational Vibration Feed Forward) function, is a method in which a head is so controlled that a head moves along the center of a track. This control is performed by, when a sensor detects vibrations, adding a correction signal whose magnitude is proportional to the vibrations, to a servo loop associated with an actuator of a disk drive.

In a hard disk drive, a voice coil motor (VCM) pivotally moves an arm, which supports a head, about a rotating shaft. This causes the head to seek a desired track of a recording medium. Therefore, a relative position between the VCM and the track of the recording medium is changed by vibrations which cause the disk drive to rotate in a direction parallel to a pivot surface of the arm (hereinafter referred to as "vibrations in the rotational direction"), so that offtracking occurs. For this reason, the disk drive is provided with a sensor for detecting vibrations in the rotational direction. There are disclosed a data storage device in which correction information from such an acceleration sensor is added to a servo loop to prevent, on the basis of the output of the sensor, correction operation from being improperly performed, and an offtrack control method thereof. See, e.g., patent document 2 (Japanese Patent Laid-Open No. 2003-346469). According to this method, a signal indicating an error of a head position is inputted to control an electric current to be supplied to a VCM so that the head position is properly corrected by the signal. Moreover, in this method, the input of a correction signal into a servo loop is stopped in the specified timing.

BRIEF SUMMARY OF THE INVENTION

In the technique described in the above patent document 1, however, it is necessary to configure a correction filter most suitable for reducing an influence exerted on the position signal in the servo system, wherein it is necessary to detect vibrations, and then to analyze a peak frequency of the vibrations. Because it takes much time for such frequency analysis, the performance of a disk drive such as an HDD decreases, which is not realistic.

Moreover, as is the case with the technique described in the patent document 2, the use of the feedback control and the feedforward control in combination makes it possible to realize a robust recorder capable of standing vibrations caused by the disturbance. However, depending on frequencies of vibrations caused by the other HDDs in the same frame, frequencies of combined vibrations, and also an environment in which the HDDs are placed, it is difficult to predict a state of vibrations that will be applied. Accordingly, a filter capable of coping with vibrations ranging over a wide band is eventually provided, which weakens the effect of reducing the vibrations.

The present invention has been devised to solve the above problems. A feature of the present invention is to provide a disk drive capable of reducing, by means of simple control, vibrations applied to the drive and vibrations occurring in the drive, and to provide a control method for controlling the disk drive.

According to one aspect of the present invention, there is provided a disk drive including a disk, a head for writing data to the disk, and/or reading data from the disk, and a drive unit for driving the head, the disk drive comprising: a vibration detector for detecting vibrations; a correction signal generator for generating a correction signal on the basis of the vibrations detected by the vibration detector; a position error signal generator for generating a position error signal on the basis of servo data read out from the disk and a target position; a servo controller for generating a servo control signal for controlling a position of the head on the basis of the position error signal; and a driving signal generator for generating a driving signal for driving the drive unit on the basis of the correction signal and the servo control signal. The correction signal generator includes a plurality of filters, each of which eliminates vibrations in each different frequency band, the correction signal generator selecting one or two or more filters from among the plurality of filters when the vibrations are detected, and then generating the correction signal so as to reduce a position error indicated by the position error signal.

In this embodiment, there are provided a plurality of filters, each of which generates a correction signal for eliminating vibrations in each different frequency band when the vibrations are applied. Further, a filter for reducing the vibrations is selected from among the filters without analyzing a frequency of the vibrations. This makes it possible to perform the feedforward control so that a position error is reduced.

In this case, when vibrations and/or a position error whose magnitude is a specified value or more occur, the correction signal generator generates the correction signal. Therefore, it is possible to execute the feedforward control when relatively strong vibrations are detected, or when a value of the position error signal becomes unstable.

In addition, the disk drive further comprises a noise elimination part for performing noise elimination processing of the position error signal. The servo controller generates the servo control signal on the basis of the position error signal, the noise elimination processing of which has been performed by the noise elimination part. The noise elimination part includes a plurality of filters, each of which eliminates vibrations in each different frequency band. Accordingly, the noise elimination part can execute the noise elimination processing of the position error signal by selecting one or two or more filters from among the plurality of filters. Here, not only for the feedforward control but also for the feedback control, it is possible to provide a function of automatically selecting one or two or more filters from among the plurality of filters in like manner.

Moreover, the disk drive further comprises an error recovery processing part for performing error recovery processing of detected read and write errors on the basis of the servo data. When a read error or a write error occurs, the error recovery processing part can instruct the correction signal generator to perform the filter selection so that the correction signal is generated. Accordingly, it is possible to switch a feedforward function ON in the error detection timing when a read or a write is made.

In this case, if a value of the position error is equivalent to a specified value or more, the error recovery processing part can instruct the correction signal generator to perform the filter selection so that the correction signal is generated. Therefore, only when the probability of an error caused by vibrations is high, it is possible to switch the feedforward function ON.

Further, if the error could not be recovered after the correction signal is generated, the correction signal generator can switch the filter to another so that the correction signal is generated. Because the correction signal generator has the plurality of filters, even if the error cannot be recovered by one filter, it is possible to use another filter to generate the correction signal.

In addition, the correction signal generator further comprises a filter selection part that includes a plurality of peak filters. The filter selection part is capable of estimating a current vibration frequency on the basis of the output values of the peak filters, and then performing the filter selection on the basis of the result of the estimation. Accordingly, by estimating a vibration frequency, and then by selecting a filter on the basis of the estimated vibration frequency to generate a correction signal, it is possible to select the most suitable filter in a short period of time.

Here, if the position error is not reduced after one or two or more filters from among the filters are selected to generate the correction signal, the correction signal generator can perform the step of: switching the filter to another to generate the correction signal; performing the filter selection at least twice to generate the correction signal so that a filter whose value of the position error is the smallest is selected; performing the filter selection so that a value of the position error becomes less than a specified threshold value, before generating the correction signal; or repeatedly performing the filter selection within a specified period of time so that a filter whose value of the position error is the smallest is selected. By use of such an automatic selection method, without analyzing a detected vibration frequency, it is possible to select, by an extremely simple method, the most suitable filter capable of preventing a position of a head from deviating, and to generate a correction signal.

Moreover, the correction signal generator can select two or more filters from among the plurality of filters so as to use the selected filters in combination to generate the correction signal. Accordingly, even if vibrations in two or more kinds of different frequency bands are applied, it is possible to eliminate its influence.

According to another aspect of the present invention, there is provided a disk drive including a disk, a head for writing data to the disk, and/or reading data from the disk, and a drive unit for driving the head, the disk drive comprising: a position error signal generator for generating a position error signal on the basis of servo data read out from the disk and a target position; a noise elimination part for performing noise elimination processing of the position error signal; a servo controller for generating, on the basis of the position error signal, the noise elimination processing of which has been performed by the noise elimination part, a servo control signal for controlling a position of the head; and a driving signal generator for generating a driving signal for driving the drive unit on the basis of the servo control signal. The noise elimination part includes a plurality of filters, each of which eliminates vibrations in each different frequency band, the noise elimination part executing the noise elimination processing of the position error signal by arbitrarily selecting one or two or more filters from among the plurality of filters.

In this embodiment, because the disk drive comprises the noise elimination part that includes the plurality of filters, each of which eliminates vibrations in each different frequency band, it is possible to execute the noise elimination processing by properly using these filters. Because the noise elimination part has the plurality of filters, it is possible to perform switching and selection from among the filters in succession so that the effect of eliminating noises becomes larger. Therefore, it is possible to perform the noise elimination processing without performing complicated processing such as the vibration frequency analysis.

According to still another aspect of the present invention, there is provided a disk drive connected to other disk drives and host equipment, the disk drive including a disk, a head for writing data to the disk, and/or reading data from the disk, and a drive unit for driving the head. The disk drive comprises: a vibration detector for detecting vibrations; a correction signal generator for generating a correction signal on the basis of the vibrations detected by the vibration detector; a communication part for notifying the host of the result of the generation by the correction signal generator; a position error signal generator for generating a position error signal on the basis of servo data read out from the disk and a target position; a servo controller for generating a servo control signal for controlling a position of the head on the basis of the position error signal; and a driving signal generator for generating a driving signal for driving the drive unit on the basis of the correction signal and the servo control signal. The correction signal generator includes a plurality of filters, each of which eliminates vibrations in each different frequency band, the correction signal generator selecting one or two or more filters from among the plurality of filters when the vibrations are detected, and then generating the correction signal so as to reduce a position error indicated by the position error signal. If the position error is reduced by the correction signal, the communication part transmits, to the host, filter information used by the correction signal generator, and then the host stores information about a surrounding environment at the time of receiving the filter information, and if nearly the same surrounding environment as that stored in the host is experienced next time, the filter information is transmitted from the host to the correction signal generator.

In the present invention, the host to which the plurality of disk drives are connected stores information about the most suitable filter selected by the correction signal generator of each of the disk drives together with environment information such as an operation state of each disk. As a result, if each disk drive experiences an environment similar to that stored in the host, the host identifies this, and then transmits filter information from the host to the disk drive in question. The disk drive can generate a correction signal according to the transmitted filter information. Therefore, each disk drive can generate a correction signal by selecting the most suitable filter only once.

According to a further aspect of the present invention, there is provided a control method for controlling a disk drive, the disk drive comprising: a disk; a head for writing data to the disk, and/or reading data from the disk; and a drive unit for driving the head. The control method comprises the steps of: generating a position error signal on the basis of servo data read out from the disk and a target position; generating a servo control signal for controlling a position of the head on the basis of the position error signal; on the basis of vibrations detected by a vibration detector for detecting vibrations, arbitrarily selecting one or two or more filters from among a plurality of filters, each of which is provided to eliminate vibrations in each different frequency band, and then generating the correction signal so as to reduce a position error indicated by the position error signal; and generating a driving signal for driving the drive unit on the basis of the correction signal and the servo control signal.

According to still a further aspect of the present invention, there is provided a control method for controlling a disk drive, the disk drive including a disk, a head for writing data to the disk, and/or reading data from the disk, and a drive unit for driving the head. The method comprises the steps of: generating a position error signal on the basis of servo data read out from the disk and a target position; arbitrarily selecting one or two or more filters from among a plurality of filters, each of which is provided to eliminate vibrations in each different frequency band, and then executing noise elimination processing of the position error signal; on the basis of the position error signal, the noise elimination processing of which has been performed, generating a servo control signal for controlling a position of the head; and generating a driving signal for driving the drive unit on the basis of the servo control signal.

According to the present invention, it is possible to provide a disk drive capable of reducing, by means of simple control, vibrations applied to the drive and vibrations occurring in the drive, and a control method for controlling the disk drive.

DETAILED DESCRIPTION OF THE INVENTION

First Embodiment

Figure 1:
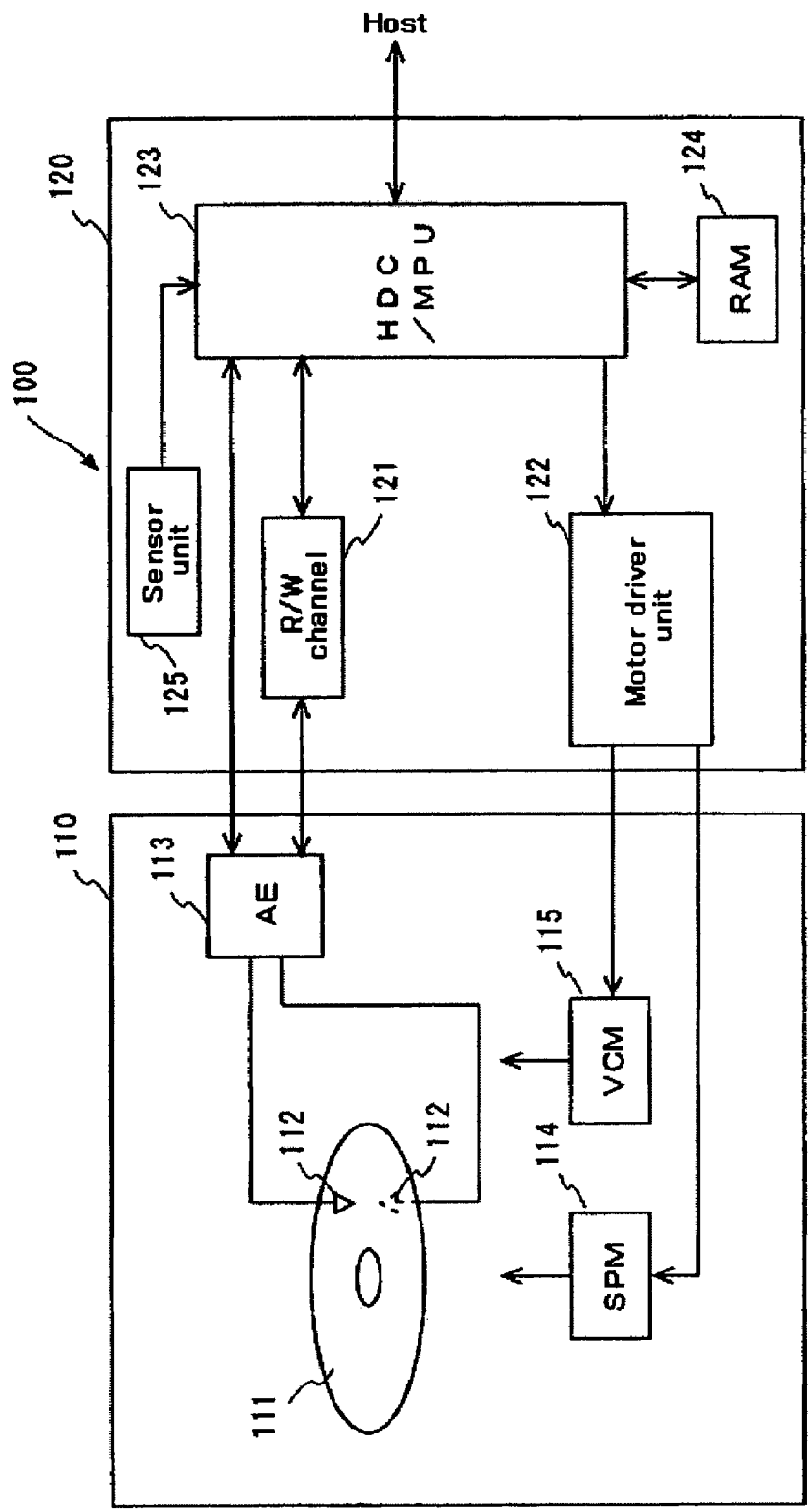
FIG. 1 is a block diagram schematically illustrating a configuration of an HDD according to a first embodiment of the present invention.

Specific embodiments to which the present invention is applied will be described in detail with reference to drawings as below. First of all, a configuration of a hard disk drive (HDD) according to a first embodiment of the present invention will be schematically described. FIG. 1 is a block diagram illustrating the HDD according to the first embodiment of the present invention.

As shown in FIG. 1, the HDD 100 includes, in a case 110, a magnetic disk 111 that is an example of a medium; a head element 112 that is an example of a head; arm electronics (AE) 113; a spindle motor (SPM) 114; and a voice coil motor (VCM) 115. The HDD 100 also includes a circuit board 120 that is secured outside the case 110. The circuit board 120 includes thereon a read/write channel (R/W channel) 121; a motor driver unit 122; a hard disk controller (HDC)/MPU integrated circuit (hereinafter referred to as "HDC/MPU") 123; and a RAM 124 that is an example of a memory.

Write data from the external host is received by the HDC/MPU 123. The write data is sent through the R/W channel 121 and the AE 113, and is then written to the magnetic disk 111 by the head element 112. Data stored on the magnetic disk 111 is read out by the head element 112. The read data is sent through the AE 113 and the R/W channel 121, and is then output from the HDC/MPU 123 to the external host.

Figure 2:
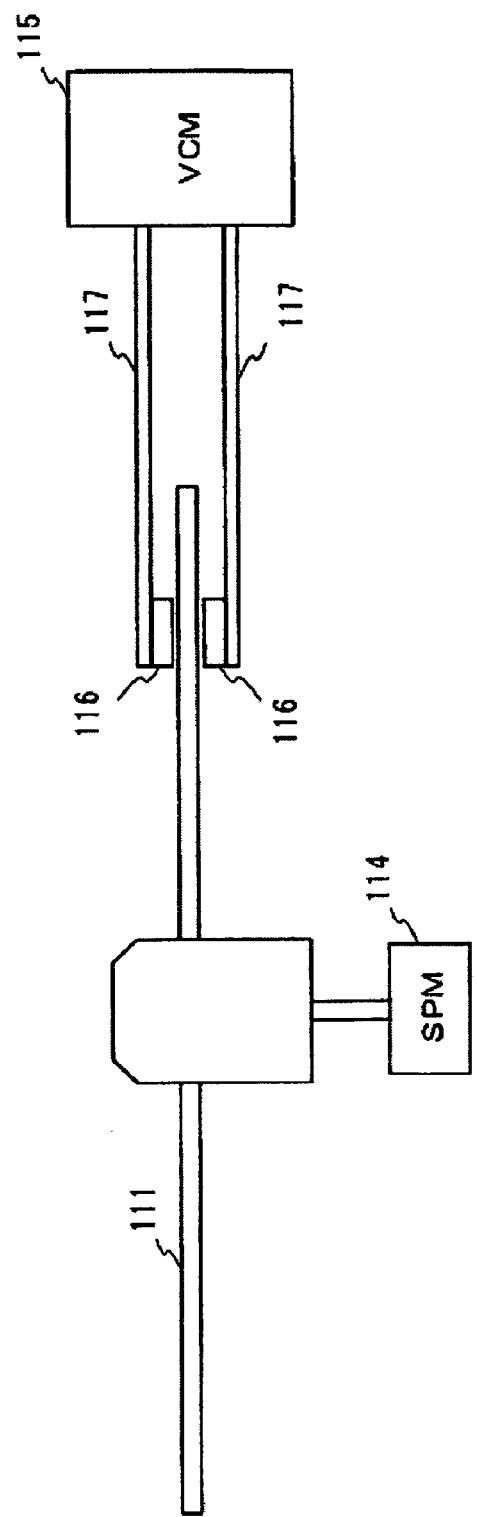
FIG. 2 is a diagram schematically illustrating a magnetic disk, and a driving mechanism of a head element, according to the first embodiment of the present invention.

Next, each element of the HDD will be described. The magnetic disk 111 and a driving mechanism of the head element 112 will be outlined with reference to FIG. 2. The magnetic disk 111 is secured to a rotating shaft of the SPM 114. The SPM 114 is driven by the motor driver unit 122. The SPM 114 rotates the magnetic disk 111 at a specified speed. The magnetic disk 111 has recording surfaces on both sides thereof, to which data is written. Each of the recording surfaces is provided with its corresponding head element 112 (not illustrated in the figure). Each head element 112 is secured to a slider 116. The slider 116 is secured to a carriage 117. The carriage 117 is secured to the VCM 115. The VCM 115 moves the slider 116 and the head element 112 through a pivotal motion.

With the object of reading/writing data from/to the magnetic disk 111, the carriage 117 moves the head element 112 to a position above a data area of the rotating magnetic disk 111 surface. As the carriage 117 pivotally moves, the head element 112 moves in the radial direction of the magnetic disk 111 over its surface. This allows the head element 112 to access a desired track.

A write head and a read head are typically combined in one unit to form the head element 112. The write head is used to convert an electric signal into a magnetic field according to data to be written to the magnetic disk 111; and the read head is used to convert a magnetic field received from the magnetic disk 111 into an electric signal. The pressure produced by air viscosity between the rotating magnetic disk 111 and an ABS (Air Bearing Surface) surface of the slider 116, which faces the magnetic disk 111, is balanced against the force applied by the carriage 117 in a direction toward the magnetic disk 111, whereby the head element 112 flies over the magnetic disk 111 with a constant gap kept. This gap is called the head flying height. It is to be noted that the required number of the magnetic disks is one or more, and that a recording surface can be formed on one side, or both sides, of the magnetic disk 111.

Next, each circuit element will be described with reference to FIG. 1. The AE 113 selects from among the plurality of head elements 112 one head element 112 that is used to access data, and amplifies (preamplifies) a read signal read by the selected head element 112 at constant gain, and then transmits the signal to the R/W channel 121. In addition, the AE 113 sends a write signal, which is received from the R/W channel 121, to the selected head element 112.

The R/W channel 121 performs write processing of data transmitted from the host. In the write processing, the R/W channel 121 performs code modulation of write data supplied from the HDC/MPU 123, and then converts the code-modulated write data into a write signal (electric current) to supply the write data to the AE 113. In addition, when data is supplied to the host, read processing is performed.

In the read processing, the R/W channel 121 amplifies a read signal supplied from the AE 113 so that it has a constant amplitude, and then extracts data from the read signal obtained to perform decode processing. Data which is read out includes user data and servo data. The decoded read data is supplied to the HDC/MPU 123.

The HDC/MPU 123 is a circuit made by integrating a MPU and an HDC into one chip. Operating according to microcodes loaded into the RAM 124, the MPU executes not only the total control of the HDD 100, including positioning control of the head element 112, interface control, and defect management, but also data processing-related necessary processing. When the HDD 100 is started up, not only microcodes to operate on the MPU but also data required for control and data processing are loaded into the RAM 124 from the magnetic disk 111 or a ROM (not illustrated in the figure).

The HDC/MPU 123 has an interface function of interfacing with the host. Using the interface function, the HDC/MPU 123 receives user data, and commands such as a read command and a write command, which are transmitted from the host. The received user data is transferred to the R/W channel 121. Further, read data, which has been read out from the magnetic disk, is acquired by the R/W channel 121, and is then transmitted to the host. Furthermore, the HDC/MPU 123 executes error correcting code (ECC) processing of the user data, which has been obtained from the host, or which has been read out from the magnetic disk 111.

The data read out by the R/W channel 121 includes not only the user data but also servo data. The HDC/MPU 123 uses the servo data to perform positioning control of the head element 112. Control data from the HDC/MPU 123 is output to the motor driver unit 122. The motor driver unit 122 supplies the VCM 115 with the driving current according to a control signal. Additionally, the HDC/MPU 123 uses the servo data to control processing of reading/writing data.

Figure 3:
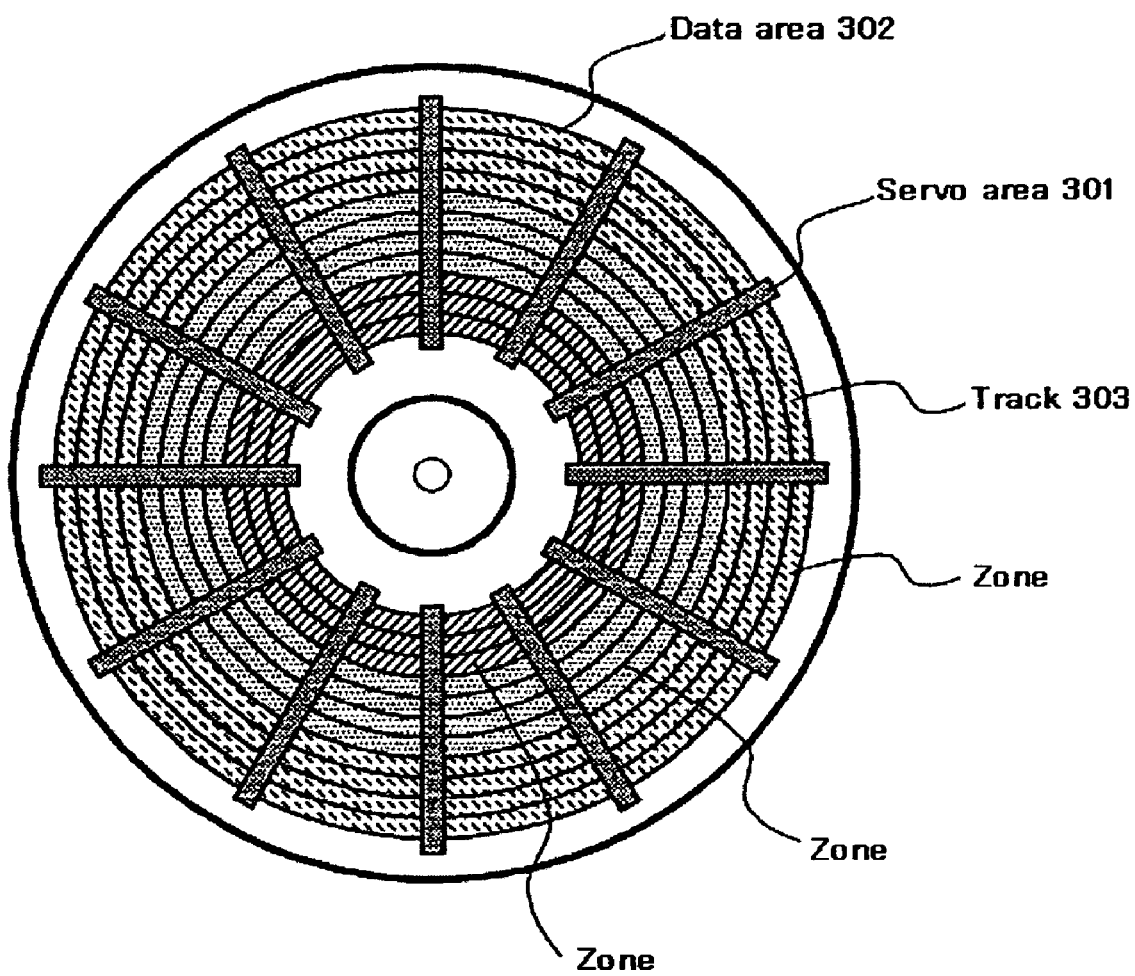
FIG. 3 is a diagram schematically illustrating a state of write data on a recording surface of a magnetic disk according to the first embodiment of the present invention.

Write data on the magnetic disk 111 will be described with reference to FIG. 3. FIG. 3 is a diagram schematically illustrating a state of write data on a recording surface of the magnetic disk 111. As shown in FIG. 3, a plurality of servo areas 301 are formed on the recording surface of the magnetic disk 111 at intervals of a specified angle. Each of the servo areas 301 radially extends in the radial direction from the center of the magnetic disk 111. There are also provided a plurality of data areas 302, each of which is formed between two adjacent servo areas 301. Thus, the servo areas 301 and the data areas 302 are alternately formed at intervals of the specified angle. Servo data used for the positioning control of the head element 112 is written to each servo area 301. User data is written to each of the data areas 302.

A plurality of tracks 303, each of which has a specified width in the radial direction, are concentrically formed on the recording surface of the magnetic disk 111. The servo data and the user data are written along the track 303. One of the tracks 303 between the servo areas 301 includes a plurality of data sectors (unit of writing user data). In addition, the tracks 303 are grouped into a plurality of zones according to their positions in the radial direction of the magnetic disk 111. The number of sectors included in each track 303 is set in each zone. FIG. 3 illustrates three zones. Changing a recording frequency on a zone basis enables an improvement in recording density.

Figure 4:
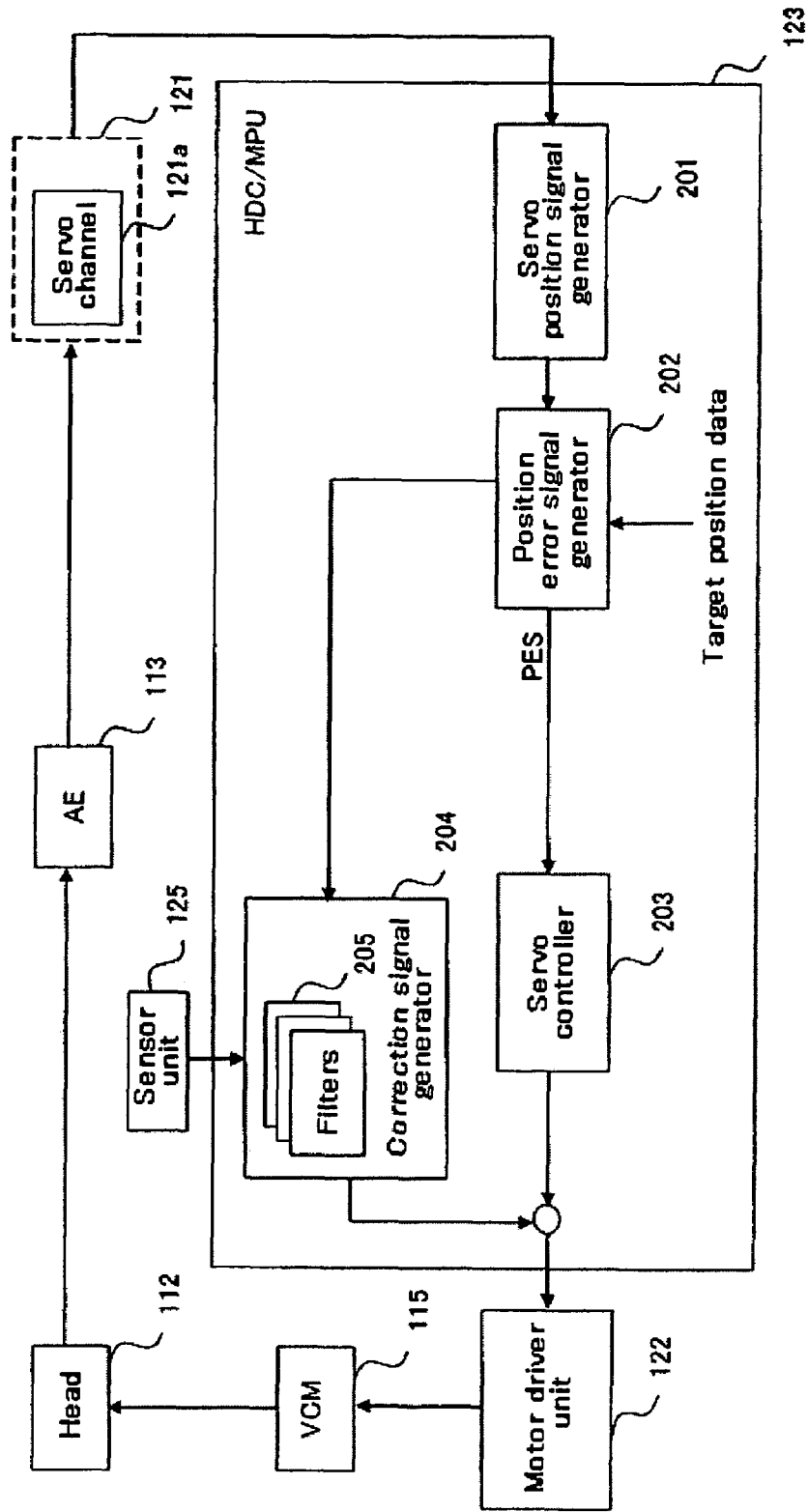
FIG. 4 is a diagram illustrating, in detail, part relating to the feedforward control (servo system), the part being extracted from among elements of the HDD according to the first embodiment of the present invention.

On the basis of the servo data written to the servo area 301, the HDD 100 performs positioning control of the head element 112 by use of the servo system described below. Next, the feedforward control of the servo system of the HDD 100 according to this embodiment will be described. FIG. 4 is a diagram illustrating, in detail, part relating to the feedforward control, the part being extracted from among elements of the HDD shown in FIG. 1.

As shown in FIG. 4, the servo system according to this embodiment includes a servo position signal generator 201, a position error signal generator 202, and a servo controller. The servo position signal generator 201 receives servo data from a servo channel 121a of the R/W channel 121, and then generate a servo position signal that indicates a current track position. The position error signal generator 202 generates a position error signal (PES) from a servo position signal and target position data. The servo controller 203 generates a servo control signal (DACOUT) for the motor driver unit 122 used to control the amount of electric current of the VCM 115 based on the position error signal.

Moreover, because the servo system according to this embodiment has an RV-FF function, the servo system further includes a sensor unit 125 for detecting vibrations, and a correction signal generator 204 for generating a correction signal on the basis of the vibrations. The RV-FF function is a function of, for example, when a plurality of HDDs are mounted to one chassis, canceling vibrations transferred from the other HDDs. The RV-FF function generates a correction signal from detected vibrations by use of the undermentioned RV-FF filter 205 so that the servo control signal is corrected. As a result, it is possible to prevent the servo function from becoming unstable by the vibrations, and thereby to avoid a decrease in performance.

Incidentally, a frequency of vibrations caused by a case differs from that of another case. If the RV-FF filter 205 for generating a correction signal from vibrations is configured to operate in response to vibrations in a certain specific frequency area, even when vibrations out of a frequency band specified for this RV-FF filter 205 are applied, the effect of avoiding the decrease in performance caused by vibrations cannot be achieved. For this reason, heretofore, it was necessary to provide microcodes of an RV-FF filter in which a frequency band is adjusted for a case to be used, and accordingly to prepare various kinds of products whose models differ from one another. In this case, when an HDD intended for a certain case is used for a different case, if a vibration frequency band of the latter case greatly differs from that of the former case, an effect of the RV-FF function cannot be sufficiently achieved. On the other hand, if the RV-FF filter is designed to cope with a wide range of vibration frequency band, an effect of the RV-FF function cannot be sufficiently achieved likewise.

In view of the above-mentioned circumstances, the RV-FF function according to this embodiment is devised to be capable of reducing vibrations in different frequency bands by preparing a plurality of RV-FF filters, each of which works in each different frequency band, and by properly selecting and using the RV-FF filters. As a result, even if vibrations in any frequency band are applied, an effect of the RV-FF function can be achieved.

To be more specific, the HDD 100 according to this embodiment is configured such that the correction signal generator 204, which generates a correction signal on the basis of vibrations detected by the sensor unit 125, includes a plurality of RV-FF filters 205 each responsive to vibrations in each different band so that the effect of the RV-FF function (feedforward control) can be achieved. The correction signal generator 204 selects one or two or more filters from among the plurality of RV-FF filters 205 to generate a correction signal. This correction signal is supplied to the motor driver unit 122 together with a servo control signal supplied from the servo controller 203. The servo control signal is corrected by the correction signal so that vibrations are reduced.

It is to be noted that each element included in the HDC/MPU 123 can be implemented by a hardware configuration, or by operating microcodes on the MPU. When hardware/software configurations are adopted, proper configurations are selected according to design. In addition, each logical block for executing required processing can also be implemented by any hardware configuration depending on the design.

Next, how this servo system operates will be described in detail. As described above, a servo signal is radially written to the magnetic disk 111. The servo signal (servo read signal) includes a gap, servo AGC (Auto Gain Control), a servo address, and a burst pattern. The gap allows the deviation in timing caused by rotational fluctuations or the like. The servo AGC is used to determine an AGC gain of the servo signal. The servo address has address information including a cylinder ID, and a servo sector number. The burst pattern is used for, for example, tracking control (track following) of the head element 112 by converting a change in amplitude of a read signal into a numerical value.

A servo signal on the magnetic disk 111 is read out by the head element 112, and is amplified by the AE 113 before the amplified servo signal is inputted into the servo channel 121a. The servo channel 121a becomes active in a specified control period to acquire a servo signal from the AE 113. The servo channel 121a analog-to-digital converts an analog servo signal coming from the AE 113 with a specified sampling frequency. Moreover, the servo channel 121a decodes a servo address from the analog-to-digital converted signal. The decoded address and the analog-to-digital converted burst signal are then transmitted to the servo position signal generator 201.

On the basis of the servo signal received from the servo channel 121a, the servo position signal generator 201 generates a servo position signal that indicates a current position of the head element 112. In addition, a target position setting part, which is not illustrated in the figure, outputs a target position signal that indicates a target position to which the head element 112 should be moved. The position error signal generator 202 makes a comparison between the servo position signal and the target position signal, and thereby generates a PES signal that indicates the amount of deviation of a current position relative to the target position, and a direction of the deviation relative to the target position. The PES signal indicates a degree at which the head element 112 deviates from the target position on the inner side, or the outer side, of the radial direction of the magnetic disk 111.

The PES signal generated by the position error signal generator 202 is inputted into the servo controller 2203. On the basis of the PES signal, the servo controller 203 generates a servo control signal (DACOUT) that is a control signal of the VCM 115.

The sensor unit 125 includes a sensor and an A/D converter. The sensor is, for example, an acceleration sensor, and is used to detect vibrations applied to the HDD 100. To be more specific, the sensor senses the acceleration exerted on the circuit board 120 of the HDD 100 to detect vibrations. The vibrations applied to the HDD 100 include various kinds of vibrations such as vibrations caused by the rotation of the SPM 114; vibrations caused by the seek operation of an actuator; vibrations caused by adjacent HDDs in a system, such as a disk array system, in which a plurality of HDDs are adjacently located; and vibrations caused by an environment in which the HDD 1 is placed. However, in this embodiment, an example in which vibrations in a rotational direction is detected will be described. It is assumed that the circuit board 120 is provided with two linear acceleration sensors so that vibrations in the rotational direction are detected. For example, two sensors are located on both ends of the circuit board 120. When the HDD 100 vibrates in a linear direction, the two sensors sense the acceleration in the same direction. On the other hand, when the HDD 100 vibrates in the rotational direction, the difference in acceleration sensed by the two sensors arises. Therefore, it is detected that vibrations in the rotational direction are applied to the HDD 100. For example, it is possible to calculate the angular speed of the rotational vibrations on the basis of the difference between the two sensors and the distance between the two sensors. As a matter of course, a rotational acceleration sensor for detecting vibrations in the rotational direction may also be used. By detecting vibrations in the rotational direction, it is possible to effectively detect a deviation in position of the head element.

A differential signal of the output of the two sensors is inputted into the A/D converter. This differential signal indicates the difference in acceleration detected by the two sensors. To be more specific, the differential signal indicates the magnitude of rotational vibrations and the direction thereof. The ADC analog-to-digital converts the differential signal that is an analog signal. A digital signal from the ADC is inputted into the HDC/MPU 123. A value indicated by this digital signal changes in response to the magnitude, and a direction, of the rotational vibrations applied to the HDD 100. Incidentally, a filter for removing noises and an amplifier for amplifying an analog signal are placed between the ADC and the sensors. Moreover, the filter and the amplifier may also be built into the sensor.

The correction signal generator 204 of the HDC/MPU 123 generates a correction signal on the basis of a digital signal received from the sensor unit 125. To be more specific, the correction signal generator 204 generates a correction signal used to move the head element 112 in such a manner that the vibrations detected by the sensor are canceled. When the output from the sensor unit 125 is not obtained (in other words, when vibrations are not detected), this correction signal is not generated. Here, upon detection of vibrations, a correction signal may be generated so that a servo control signal is corrected. However, another configuration may also be adopted. For example, when a level of vibrations which are steadily applied to the HDD 100 is high, the RV-FF function is switched ON, and the correction signal generator 204 generates a driving signal on the basis of a correction signal and a servo control signal, and then outputs the driving signal to the motor driver unit 122. To be more specific, if a digital signal received from the sensor unit 125 indicates vibrations, the magnitude of which is a specified value or more, the RV-FF function is switched ON, and a correction signal is generated.

In another case, if a position error indicated by the PES signal generated by the position error signal generator 202 exceeds a specified value, the RV-FF function is switched ON so that a correction signal is generated. Incidentally, this RV-FF function is switched ON on the premise that when a position error is large, vibrations are detected. Moreover, the above methods can also be applied in combination. Thus, by switching the RV-FF function ON only when a predetermined condition is met, it is possible to prevent a correction signal from being generated by noises or the like.

When the RV-FF function is switched ON and a correction signal is generated, the motor driver unit 122, which is used as a driving signal generator, generates a driving signal (driving current), and supplies the driving signal to the VCM 115 together with the servo control signal received from the servo controller 203. The driving signal is generated, for example, by subtracting the correction signal from the servo control signal. This driving signal drives the VCM 115, and the actuator including the VCM 115 operates. As a result, the head element 112 moves. Accordingly, even if vibrations occur, it is possible to correctly read and write data. Incidentally, when a level of vibrations which are applied to the HDD 100 is low, and/or when a position error is small, the correction signal generator 204 does not generate a correction signal. In this case, a driving signal is generated only on the basis of a servo control signal, and accordingly the RV-FF function does not work.

Here, the correction signal generator 204 according to this embodiment has, for example, filter parameters of various frequency bands in advance. By configuring the RV-FF filter 205 that is capable of coping with vibrations using these filter parameters, it is possible to make full use of the RV-FF function even if any kind of vibrations are applied to the HDD 100.

In this embodiment, the RV-FF filters 205 for acquiring a correction signal is not analyzed for a frequency component of vibrations. For example, on the basis of whether or not a position error becomes small, the prepared RV-FF filters 205 are successively selected such that a correction signal is generated. For example, when it is possible to configure three RV-FF filters 205, each of which works in vibrations having different frequency bands, these RV-FF filters 205 are successively switched so that a correction signal is generated, and the VCM 115 is driven. As a result, an RV-FF filter 205 having the smallest value (position error) indicated by the position error signal acquired, is selected. In this way, the most suitable RV-FF filter 205 capable of reducing current vibrations can be selected from among the RV-FF filters 205 included in the correction signal generator 204 and a correction signal is generated.

Alternatively, an allowable value of a position error is determined beforehand. In this case, the VCM 115 is driven with a servo control signal that has been corrected by a correction signal generated by one RV-FF filter 205. As a result, if the position error is not smaller than the allowable value, the RV-FF filter 205 in question is switched to another, and the above processing is repeated again. Thus, by repeating the selection of one RV-FF filter 205 until the position error becomes less than the allowable value, it is possible to select, in a shorter period of time, an RV-FF filter 205 whose position error is smaller than the allowable value, and then to generate a correction signal.

Alternatively, the length of time it takes to select a filter is predetermined. In this case, one RV-FF filter 205 is selected to generate a correction signal, and then the VCM is driven to acquire a position error signal. This processing is repeated until the predetermined length of time elapses, and thereby an RV-FF filter 205 whose position error becomes the smallest is selected. This makes it possible to select the most suitable RV-FF filter 205 within the limited length of time.

In addition, when an RV-FF filter 205 is selected, the number of RV-FF filters 205 which are selected at the same time is not limited to one. More specifically, two RV-FF filters 205, or three or more RV-FF filters 205, may also be selected at the same time. This also makes it possible to configure RV-FF filters 205 that are capable of coping with a wider variety of vibrations.

In this embodiment, one RV-FF filter 205 is selected to generate a correction signal. However, if this correction signal does not result in an improvement in position error, the RV-FF filter 205 is switched to the next RV-FF filter 205. Thus, by selecting and configuring the most suitable filter using an extremely simple method, it becomes possible to select in a short period of time a high-performance filter capable of reducing vibrations that are currently applied to the drive. Moreover, if vibrations, the magnitude of which is a specified value or more, is detected, and/or if a position error becomes larger than a specified value (if the stability of PES becomes worse), switching the RV-FF function ON makes it possible to prevent the feedforward control from being improperly executed due to noises or the like.

First Modification Example

Figure 5:
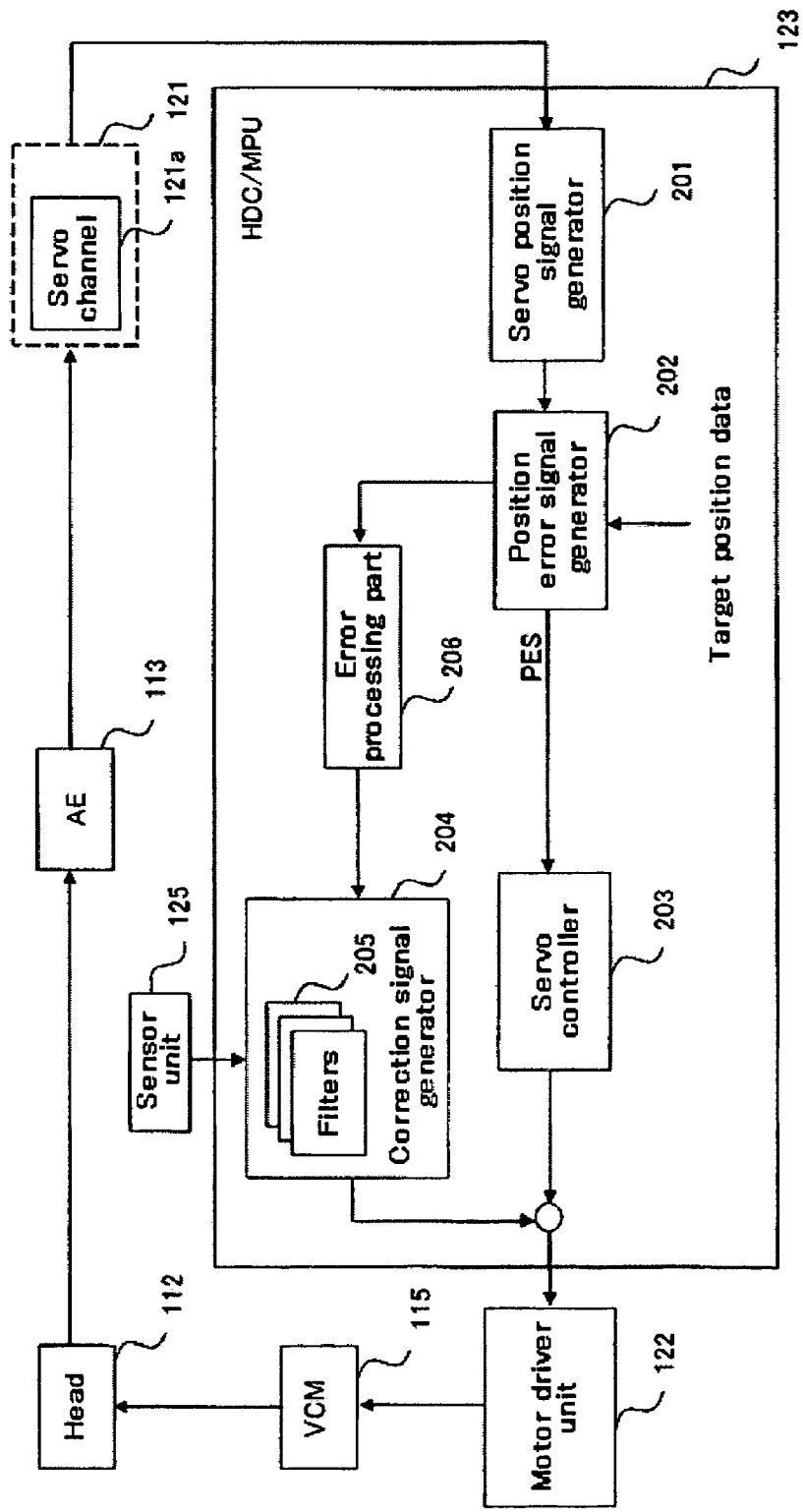
FIG. 5 is a diagram illustrating a first modification example of a servo system of the HDD according to the first embodiment of the present invention.

Next, a first modification example of a servo system according to this embodiment will be described. FIG. 5 is a diagram illustrating the first modification example of the servo system according to this embodiment. Incidentally, in the fist modification example shown in FIG. 5, and in examples shown in FIGS. 7, 9, and 10, identical reference numerals are used to designate elements similar to those included in the servo system shown in FIG. 4, and the detailed description thereof will be omitted.

The HDD 100 usually has error recovery procedure (ERP) used when a write error or a read error occurs. In this embodiment, as shown in FIG. 5, an error processing part 206 executes the ERP. When a write error or a read error is detected, the position error signal generator 202 notifies this error processing part 206 of the error.

The error processing part 206 includes several tens of recovery processes for the ERP. In the recovery processes, the error processing part 206 instructs the correction signal generator 204 to execute the generation of a correction signal. It is possible to configure the correction signal generator 204 adapted to function when vibrations, the magnitude of which is a specified value or more, are detected as described above, or when a value of PES is not stable. However, if the function in question is switched ON to generate a correction signal, for example, only when a write error occurs, the ON/OFF control of the RV-FF function becomes extremely simple.

Figure 6:
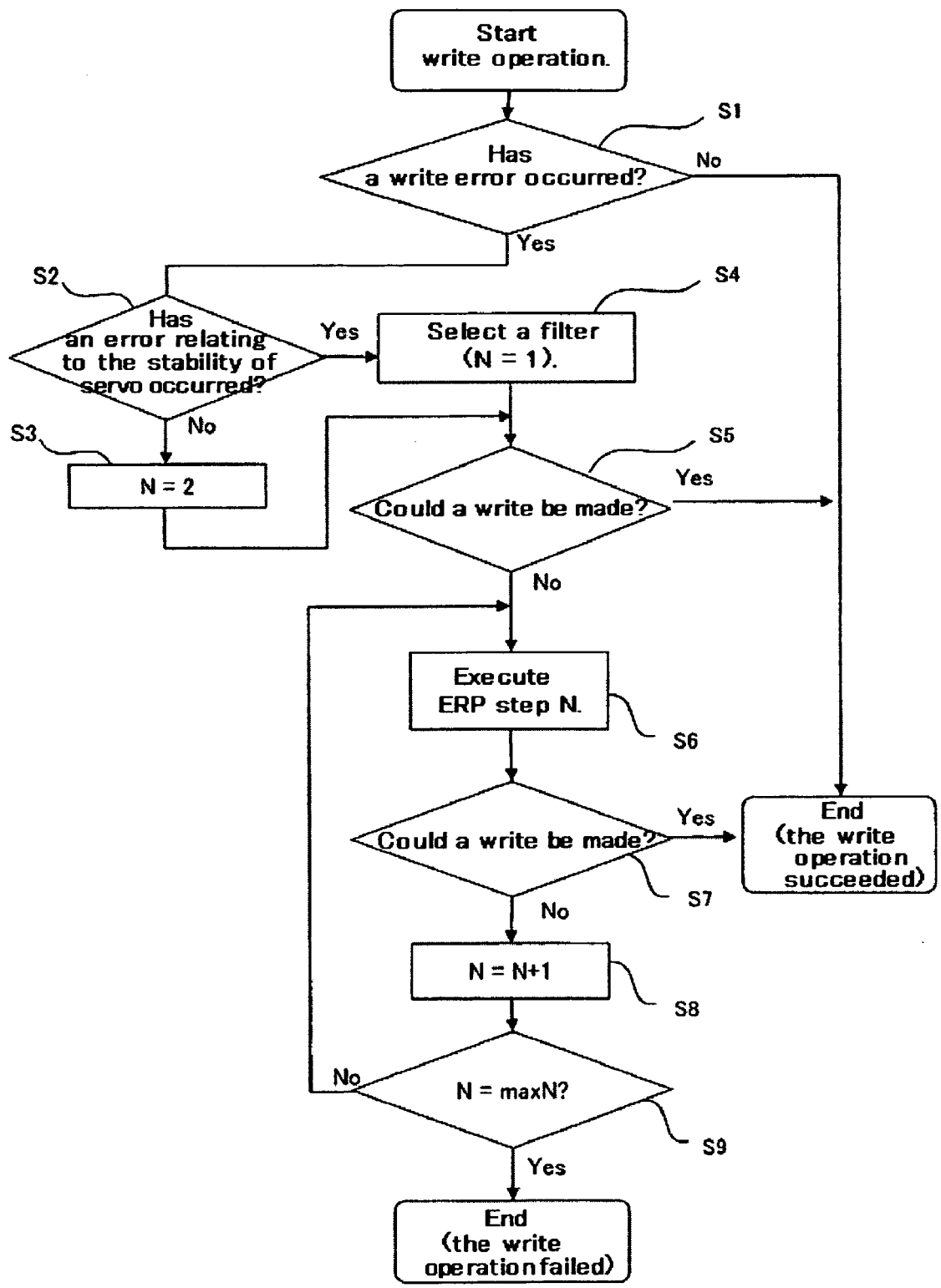
FIG. 6 is a flowchart illustrating operation of an error processing part in the first modification example of the servo system of the HDD according to the first embodiment of the present invention.

FIG. 6 is a flowchart illustrating ERP of the error processing part 206. Incidentally, in the description of this embodiment, one ERP step to be executed when a write error occurs involves that a filter for the correction signal generator 204 is switched to another to generate a correction signal again before write operation is executed. However, it is needless to say that the above processing may also be performed in one ERP step when a read error occurs.

As shown in FIG. 6, if a write error occurs as a result of executing the write operation (step S1), the HDC/MPU 123 executes the ERP until the write operation succeeds. Incidentally, although the ERP usually includes several tens of processes, if a write error occurs again at the point of time at which all of the processes are completed, the write operation fails.

When a write error occurs, a type of write error is identified. The type of write error includes such cases as described below. When the quality of servo data which has been read out is low (for example, the servo data is not successfully written to a disk, or the intensity of the servo data is low), it is judged that a write error has occurred. In another case, when a position error signal acquired from servo data deviates from a target value (more specifically, an acquired value deviates from 0), it is also judged that a write error has occurred. Hereinafter, the latter case is called "servo stability error." If a write error is detected, the type of the write error is identified. Here, an error relating to the quality of servo data and an error relating to the stability of the servo data are judged (step S2). To be more specific, it is thought that if the write error is judged to be the error relating to the quality, the servo data itself, which is written to the disk, has a problem, whereas if the stability of servo cannot be achieved, vibrations from the outside cause the instability. Therefore, if a servo stability error occurs, an RV-FF filter is selected in the correction signal generator 204 to generate a correction signal as a first ERP step (step S4).

In a filter selection process in the step S4, once the RV-FF function is switched ON and a filter is selected, the filter may be switched to another the specified number of times, which is an upper limit, until a write can be made. In this case, the filter may also be repeatedly switched to another so as to try all filters. When a write operation can be made only by switching a filter (step S5: Yes), the ERP processing can be extremely quickly completed. In addition, there may be a case where an error cannot be fixed even if the filter is switched to another the specified number of times, or even if the filter is repeatedly switched to another until all filters are tried. Even in such a case, it is also possible to select a filter whose servo stability is the highest, and then to proceed to the next ERP step.

It is to be noted that the RV-FF function is switched ON on the premise that vibrations have been detected. As described above, if vibrations whose magnitude is a specified value or more are detected, or if the stability of PES is low, the RV-FF function is switched ON. In addition to these cases, the RV-FF function may also be switched ON if a write error, or the like, occurs as described in the first modification example. In this case, when it is judged in the step S2 that a write error caused by the servo instability occurs, if the RV-FF function is kept ON, the RV-FF filter is switched in the step S4.

On the other hand, if a write error caused by the low servo quality occurs (step S2: No), predetermined ERP processing (N=2) is executed (step S3). Then, if a write operation cannot be made (step S5: No), ERP steps are sequentially executed up to the last step with a judgment being made as to whether or not the write error could be fixed. At a point in time at which a write could be made, the ERP ends (steps S6 through S9).

As described above, in this first modification example, when a write error or a read error is detected, if the error in question is caused by the low stability of servo data, the error processing part 206 instructs the correction signal generator 204 to select or switch a filter. As a result, there is a case where the ERP can be simply completed in a short period of time. Accordingly, by adding the filter selection process in the ERP steps, it is possible to make full use of the RV-FF function extremely simply and effectively.

Second Modification Example

Figure 7:
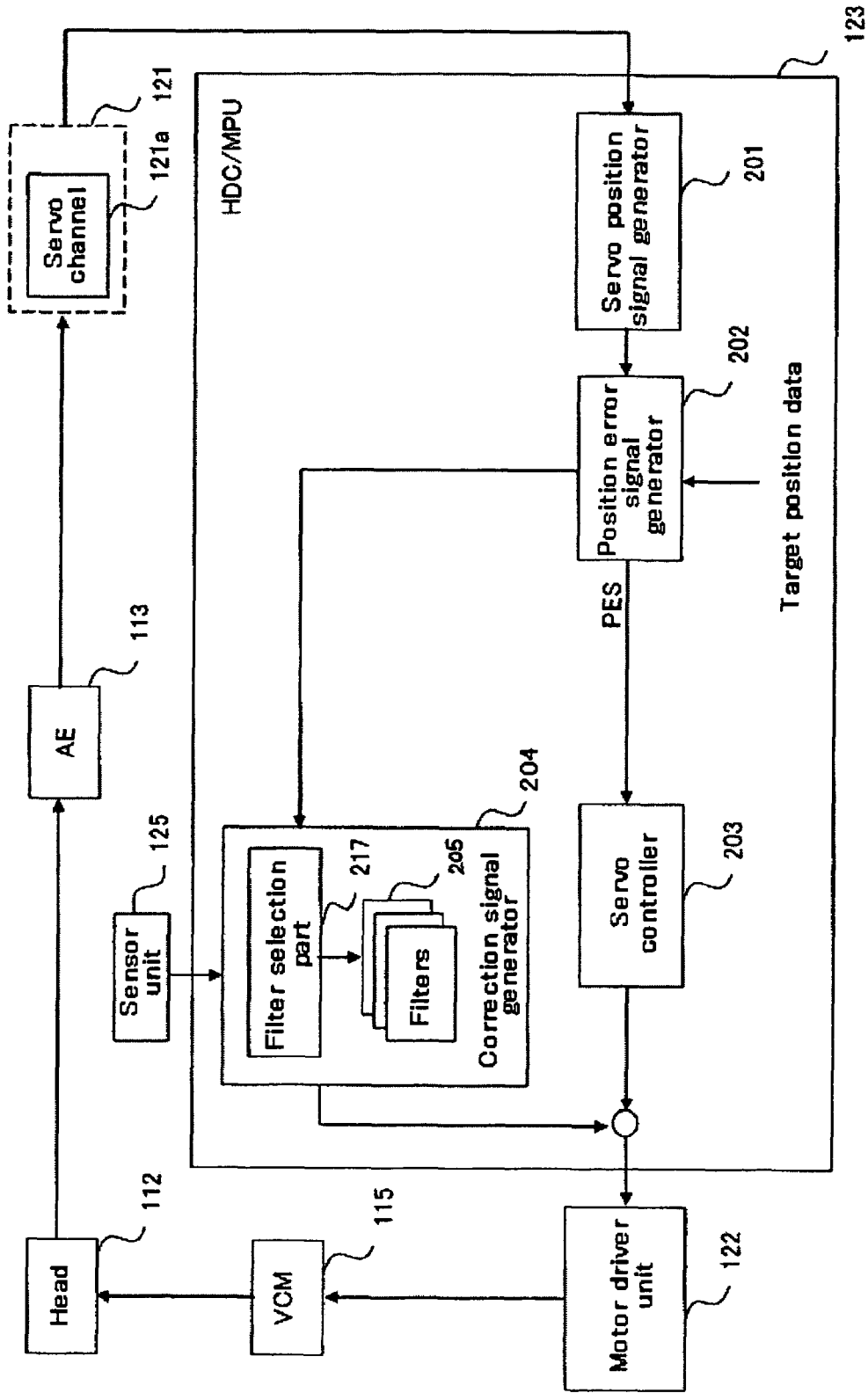
FIG. 7 is a diagram illustrating a second modification example of a servo system of the HDD according to the first embodiment of the present invention.

Next, a second modification example of a servo system according to this embodiment will be described. FIG. 7 is a diagram illustrating the second modification example of the servo system according to this embodiment. In the above-mentioned embodiment and first modification example, without conventional processing such as frequency analysis of vibrations, one RV-FF filter 205 is arbitrarily selected from among the plurality of RV-FF filters 205, and if a position error does not become small, the RV-FF filter 205 in question is switched to another RV-FF filter 205 so that a correction signal is generated. However, in this second modification example, a selection mechanism for selecting an RV-FF filter 205 is newly provided.

To be more specific, as shown in FIG. 7, the correction signal generator 214 according to the second modification example includes: a filter selection part 217 for selecting an RV-FF filter 205 according to the output from the sensor unit 125; and RV-FF filters 205. The filter selection part 217 is formed of a plurality of peak filters. Based on the output of these peak filters, the filter selection part 217 judges the frequency of vibrations that are currently applied to the drive.

For example, when three kinds of RV-FF filters 205 are provided to eliminate vibrations in different frequency bands, peak filters for three kinds of RV-FF filters 205 are provided, and it is most convenient that a peak filter whose output is the largest when detected vibrations are inputted is selected.

A peak filter is prepared at intervals of 50 Hz in a frequency band whose frequency ranges from 100 Hz to 1 KHz, for example. The thus-prepared filters are successively set, and they are checked for their respective outputs. The frequency at which the output is the largest is estimated to be the frequency of vibrations that currently exert the largest influence on the drive. The RV-FF filter 205 can also be configured in such a manner that parameters of an RV-FF filter 205 associated with the estimated frequency are extracted from a list. This method can also be adopted. In this case, it is also possible to select RV-FF filters 205, for example, so as to cope with all vibration frequencies covered by peak filters whose output is larger than a certain value. In other words, two or more RV-FF filters 205 may also be selected depending on a detected vibration frequency.

According to this modification example, by providing the filter selection part 217 formed of the plurality of peak filters, an RV-FF filter 205 which is the most suitable for the reduction of vibrations can be selected by simpler processing in a shorter period of time in comparison with the frequency analysis or the like.

Figure 8:
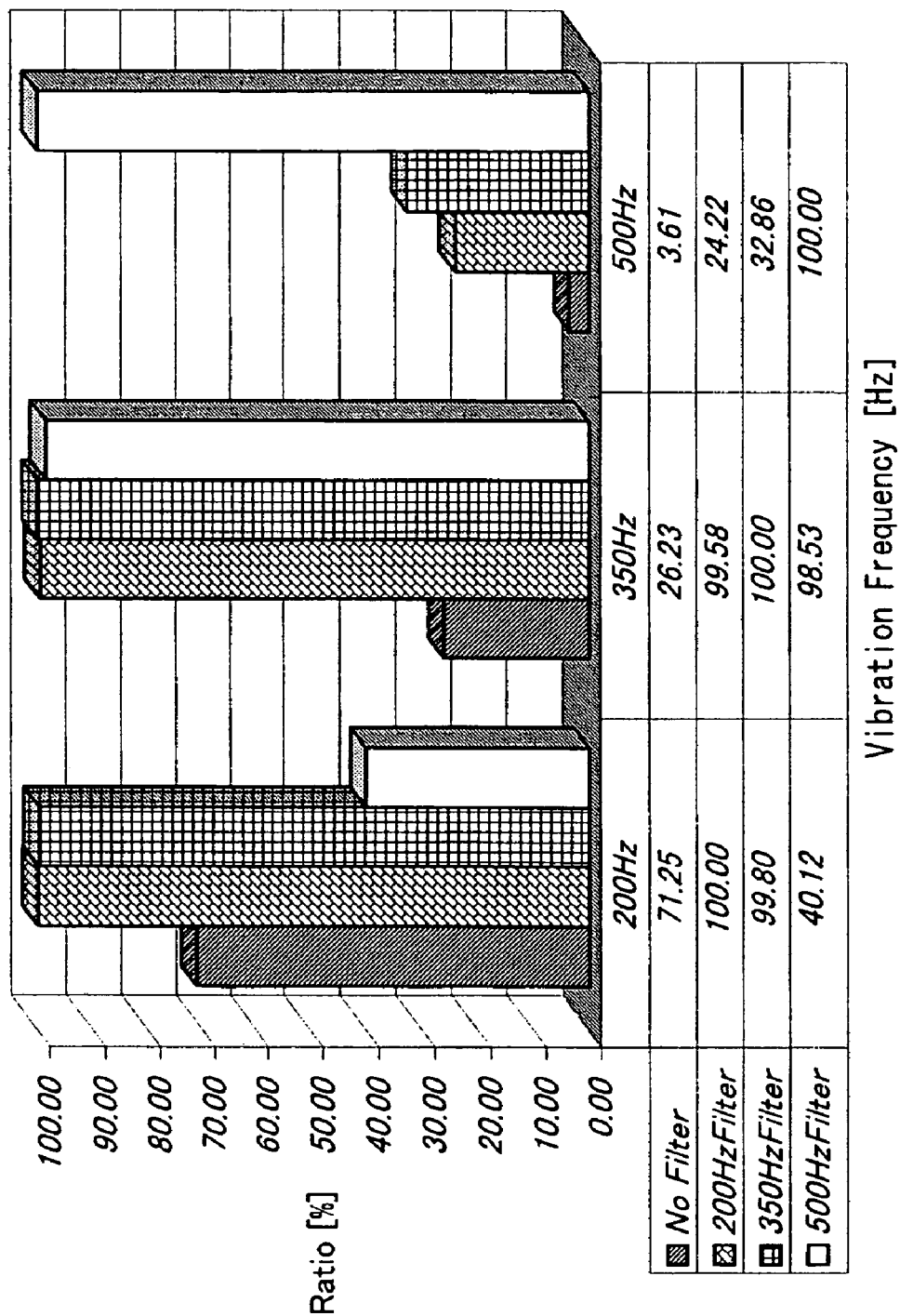
FIG. 8 is a graph illustrating effects produced when the first embodiment of the present invention is applied.

Next, effects produced in the embodiment described above will be described. FIG. 8 is a graph illustrating an experimental example to which this embodiment is applied. In the experiment, RV-FF filters 205 that are the most suitable for each of the vibration frequencies of 200 Hz, 300 Hz, and 500 Hz, were provided. Then, each of the RV-FF filters 205 was used to measure the performance in a state in which the vibrations of 200 Hz, 350 Hz, and 500 Hz were applied.

FIG. 8 illustrates a value of each filter on the assumption that the performance achieved by using the RV-FF filters 205, each of which is the most suitable for each vibration frequency, is 100. As shown in FIG. 5, the performance achieved by using the RV-FF filters 205, each of which is the most suitable for each vibration frequency, is the best. On the other hand, when an RV-FF filter 205 which is not suitable for the vibration frequency is used, the performance decreased. As clearly understood from this result, using an RV-FF filter which is most suitable for vibrations is an important matter for making full use of the RV-FF function. In the HDD 100 according to this embodiment, which is capable of automatically selecting the most suitable filter, it is not necessary to prepare many product models and the most effective performance can be achieved for cases by only one model even when they are subject to any kind of vibrations.

Second Embodiment

Figure 9:
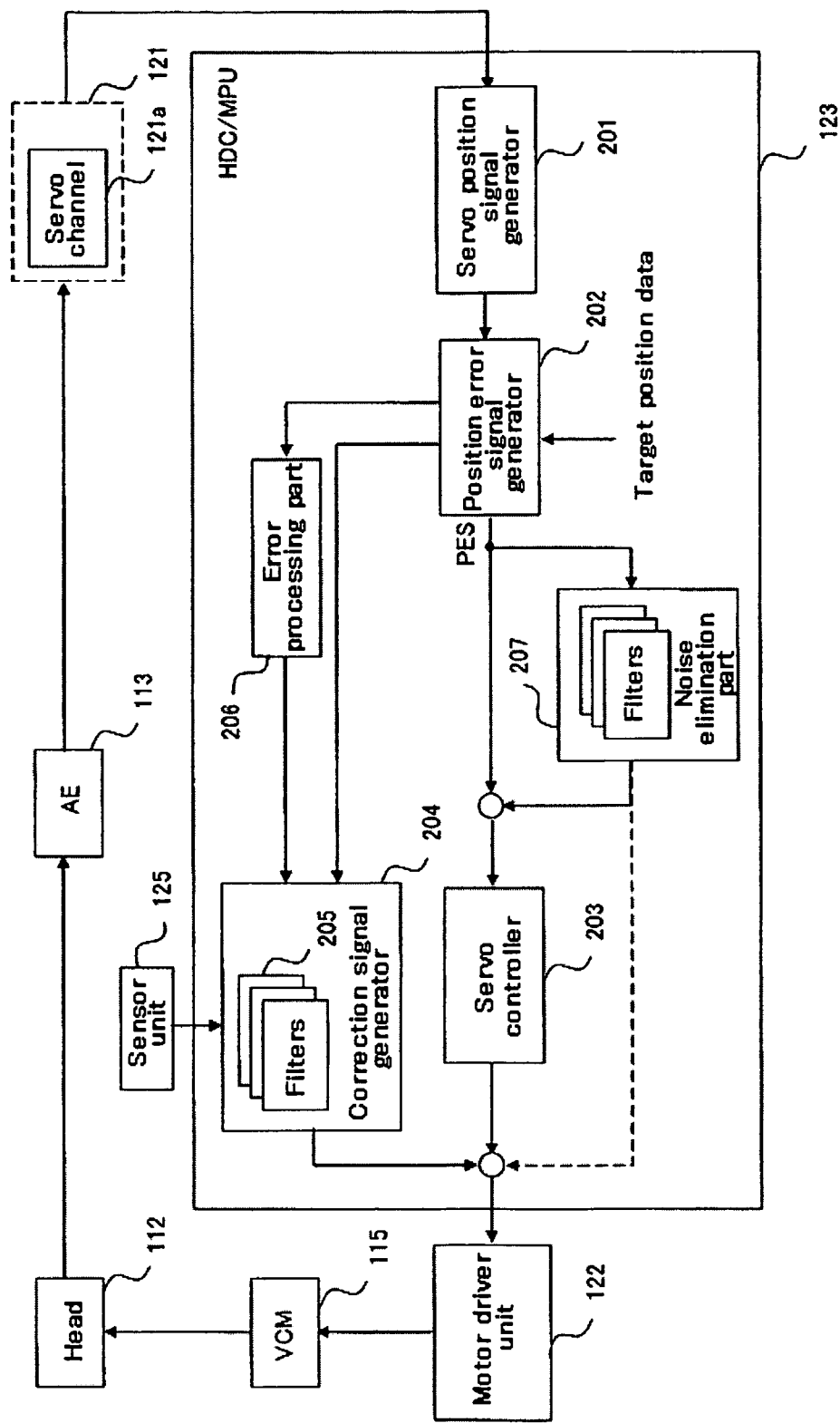
FIG. 9 is a diagram illustrating a servo system of an HDD according to a second embodiment of the present invention.

As shown in FIG. 9, the HDC/MPU 123 according to this embodiment includes a noise elimination part 207 that is located between the position error signal generator 202 and the servo controller 203. The other elements are similar to those in the first embodiment shown in FIG. 4. As is the case with the correction signal generator, the noise elimination part 207 has a list of filter parameters, which is used to configure a filter capable of coping with a plurality of vibration frequencies. When a position error signal is inputted from the position error signal generator 202, any one of filters is selected, or a plurality of filters are selected if necessary, so that the noises are eliminated by the filter.

A PES signal generated by the position error signal generator 202 is inputted into the noise elimination part 207. The noise elimination part 207 includes a plurality of peak filters for frequencies each being equivalent to each of integral multiples (the integral multiples include 1 times) of the rotational frequency of the magnetic disk 111.

The output from the noise elimination part 207 is combined with a PES signal received from the position error signal generator 202 by a combination element. The combined signal is inputted into the servo controller 203. On the basis of the PES signal and the output signal of the noise elimination part 207, the servo controller 203 generates a servo control signal.

Thus, in the servo system according to this embodiment, on the basis of both the PES signal generated by the position error signal generator 202 and the output from the noise elimination part 207 for filtering the PES signal, the servo controller 203 generates a servo control signal that is a control signal of the VCM 115. By properly selecting a filter in the noise elimination part 207 so that a value of the position error signal becomes smaller, it is possible to effectively compensate for a repetition error of the servo signal for example.

Here, a position at which the noise elimination part 207 is inserted is not limited between the output of the position error signal generator 202 and the input of the servo controller 203. In FIG. 9, as shown with a broken line, the noise elimination part 207 can also be connected from the PES signal to the output of the servo controller 203 (the input of DACOUT). The servo controller 203 generates a control signal on the basis of the PES signal received from the position error signal generator 202. In addition, the PES signal coming from the position error signal generator 202 is inputted into the noise elimination part 207. The output signal of the noise elimination part 207 and the control signal from the servo controller 203 are inputted into the combination element. If vibrations are detected, or if a write error or a read error occurs, a correction signal is also inputted into the combination element. The combined signal is then output to the motor driver unit 122 as a control signal DACOUT. Thus, by inserting the specified noise elimination part 207 into a feedback path of the servo system to properly switch a filter, it is possible to compensate for a repetition error.

The filter selection can be performed by a similar method to that used in the first embodiment. To be more specific, it is most convenient that the noise elimination part 207 is provided with a plurality of filters beforehand, and when PES becomes unstable, a PES signal is also inputted into the noise elimination part 207, and any one of the filters is then selected to execute noise elimination processing. As a result, if the stability of PES is not improved, it is possible to select the most suitable filter by repeating the steps of switching a filter of the noise elimination part to another to execute the noise elimination processing again.

Alternatively, as described above, it is also possible to select the most effective filter by executing the noise elimination processing for some or all of the filters included in the noise elimination part 207. Moreover, in this embodiment, the noise elimination part 207 is added to the first modification example. However, it is needless to say that the servo system shown in FIG. 4 or 7 may also include the noise elimination part 207.

Third Embodiment

Figure 10:
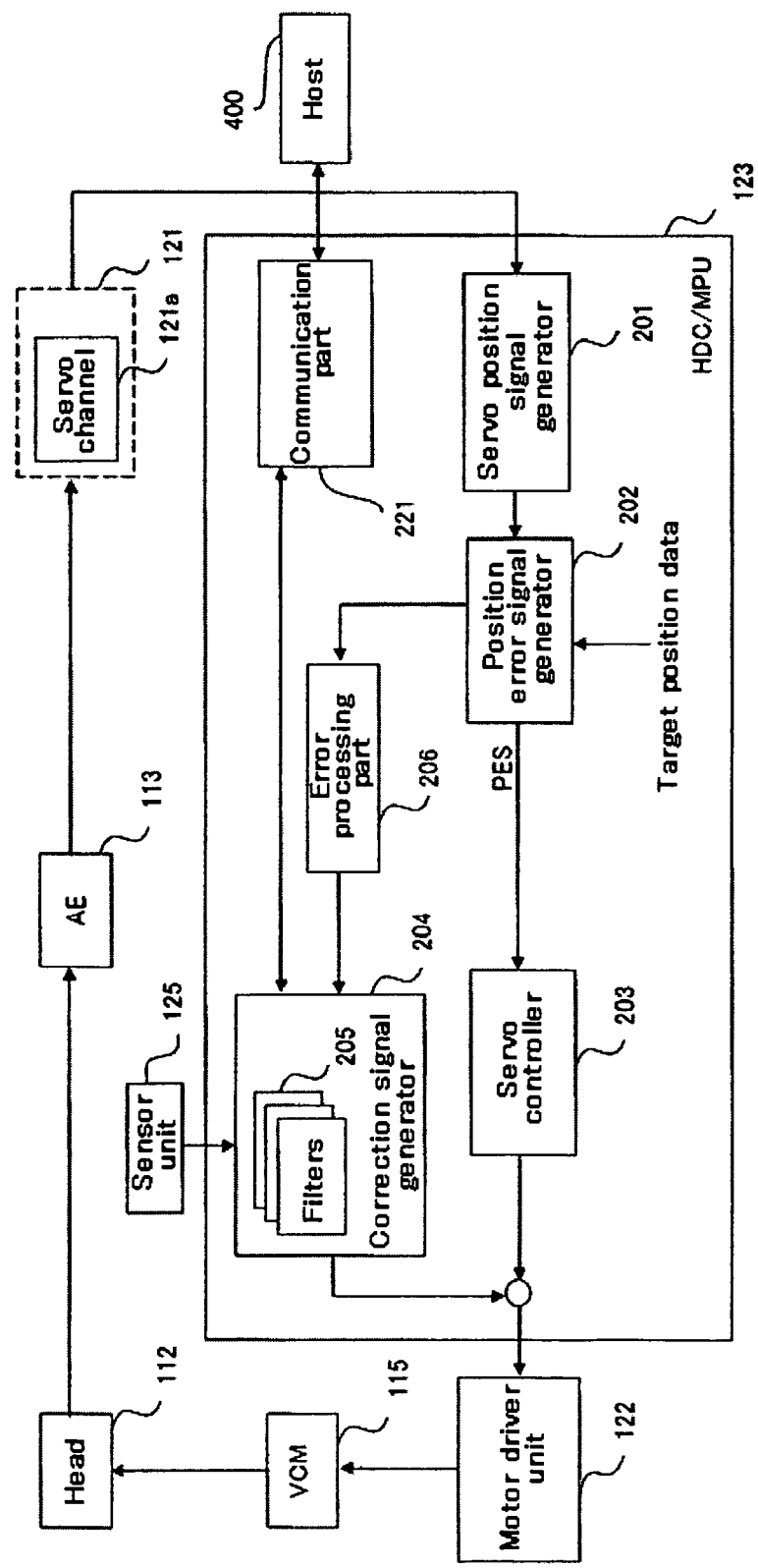
FIG. 10 is a diagram illustrating a servo system of an HDD according to a third embodiment of the present invention.

Next, a third embodiment will be described as below. FIG. 10 is a diagram illustrating, in detail, part relating to servo control according to the third embodiment, the part being extracted from among elements of the HDD shown in FIG. 1. In this embodiment, a host 400 is notified of the result of selecting the RV-FF filter 205 by the correction signal generator 204 (hereinafter referred to as "filter information"), which was described in the first embodiment, through a communication part 221. When the most suitable RV-FF filter 205 is selected, the correction signal generator 204 transmits the filter information thereof to the communication part 221. Then, the communication part 221 transmits the filter information to the host 400.

A plurality of HDDs are connected to the host 400. If vibrations are detected, PES becomes unstable, or a write error or a read error occurs, each of the HDDs executes processing of selecting the most suitable RV-FF filter 205. After that, each of the HDDs transmits, to the host 400, filter information of the most suitable RV-FF filter 205 selected as the result of the execution. On the receipt of the filter information transmitted from the HDD 100, the host 400 stores the filter information together with the surrounding situation (environment) at that point of time. To be more specific, the situation to be stored includes information indicating which HDD(s) is currently operating among HDDs other than the HDD whose filter information has been notified. For example, the situation to be stored means information indicating that HDDs located above and below the HDD 100 are operating. Then, when the same condition is satisfied next, the filter information which has been previously transmitted is transmitted to the communication part 221 of the HDD 100.

On the receipt of the filter information, the communication part 221 transmits this filter information to the correction signal generator 204 so that a filter indicated by the filter information in question is selected. There is a high probability that similar vibrations will occur in the similar environment. Therefore, once processing of selecting the most suitable filter is performed to acquire the result of the processing, it is not necessary to perform the selection processing of the RV-FF filter 205 again. The correction signal generator 204 can generate a correction signal according to an instruction from the host 400.

Incidentally, if a correction signal generated by the RV-FF filter 205 specified by the filter information does not reduce a position error, the selection processing of selecting the RV-FF filter 205 may also be performed again. In this case, if an RV-FF filter 205 which differs from that indicated by the filter information is selected, it is also possible to transmit filter information to the host 400 through the communication part 221 again.

In this embodiment, the function of transmitting filter information to the host 400 is included in the servo system in the first modification example shown in FIG. 5, in which error detection is notified from the error processing part 206 at the time of ON/OFF control of the RV-FF function. However, it is needless to say that that the servo system shown in FIG. 4 or 7 may also be configured to have the function in question.

Moreover, filter information of the noise elimination part 207 according to the second embodiment may also be transmitted to the host 400. In this case, for example, every time the HDD 100 starts up, filter information of the noise elimination part 207 is received, and then a filter can be selected according to the filter information.

In this embodiment, the host to which the plurality of HDDs are connected stores information about RV-FF filters of the HDDs in response to the environment thereof. As a result, it is possible to eliminate the need for the filter selection process at the time when the similar environment is provided. Furthermore, the host can also store not only filter information, but also the operation situation of HDDs and that of the other devices, and other information about environment.

As described above, the HDD according to this embodiment is capable of effectively compensating for extraneous vibrations, RRO while keeping the servo system stable. In this embodiment, although the HDD can perform both data write processing and data read processing, the present invention can also be applied to a read dedicated device that performs only read processing. It is to be noted that although the present invention is in particular useful for magnetic disk storage devices, the present invention can also be applied to storage devices in other modes such as an optical storage device for optically handling stored data, or to other servo systems of target devices to be controlled.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive including a disk, a head for writing data to the disk, and/or reading data from the disk, and a drive unit for driving the head, said disk drive comprising:
   a vibration detector to detect vibrations;
   a correction signal generator to generate a correction signal on the basis of the vibrations detected by the vibration detector;
   a position error signal generator to generate a position error signal on the basis of servo data read out from the disk and a target position;
   a servo controller to generate a servo control signal for controlling a position of the head on the basis of the position error signal; and
   a driving signal generator to generate a driving signal for driving the drive unit on the basis of the correction signal and the servo control signal;
   wherein said correction signal generator includes a plurality of filters, each of which eliminates vibrations in each different frequency band, said correction signal generator selecting one or two or more filters from among the plurality of filters when the vibrations are detected, and then generating the correction signal so as to reduce a position error indicated by the position error signal, the disk drive further comprising,
   an error recovery processing part to perform error recovery processing of detected read and write errors on the basis of the servo data,
   wherein when a read error or a write error occurs, said error recovery processing part instructs the correction signal generator to perform the filter selection so that the correction signal is generated.

2. A disk drive according to claim 1, wherein:
   when vibrations and/or a position error whose magnitude is a specified value or more occur, said correction signal generator generates the correction signal.

3. A disk drive according to claim 1, further comprising:
   a noise elimination part to perform noise elimination processing of the position error signal,
   wherein said servo controller generates the servo control signal on the basis of a position error signal, the noise elimination processing of which has been performed by the noise elimination part; and
   wherein said noise elimination part includes a plurality of noise elimination filters, each of which eliminates noise in each different frequency band, said noise elimination part executing the noise elimination processing of the position error signal by selecting one or two or more noise elimination filters from among the plurality of noise elimination filters.

4. A disk drive according to claim 1, wherein:
   if a value of the position error is equal to a specified value or more, said correction signal generator is instructed to perform the filter selection so that the correction signal is generated.

5. A disk drive according to claim 1, wherein:
   if the error could not be recovered after the correction signal is generated, said correction signal generator switches the filter to another to generate the correction signal.

6. A disk drive according to claim 1, wherein:
   said correction signal generator further comprises a filter selection part that includes a plurality of peak filters; and
   said filter selection part estimates a current vibration frequency on the basis of the output value of the peak filters, and then performs filter selection from the peak filters on the basis of the result of the estimation.

7. A disk drive according to claim 1, wherein:
if the position error is not reduced even after said one or two or more filters are selected to generate the correction signal, said correction signal generator switches the filter to another to generate the correction signal.

8. A disk drive according to claim 1, wherein:
said correction signal generator performs the filter selection at least twice to generate the correction signal, and thereby selects a filter whose value of the position error is the smallest.

9. A disk drive according to claim 1, wherein:
said correction signal generator performs the filter selection so that a value of the position error becomes less than a specified threshold value, before generating the correction signal.

10. A disk drive according to claim 1, wherein:
said correction signal generator repeatedly performs the filter selection within a specified period of time so that a filter whose value of the position error is the smallest is selected.

11. A disk drive according to claim 1, wherein:
said correction signal generator selects two or more filters from among the plurality of filters so as to use the selected filters in combination to generate the correction signal.

12. A disk drive including a disk, a head for writing data to the disk, and/or reading data from the disk, and a drive unit for driving the head, said disk drive comprising:
a position error signal generator to generate a position error signal on the basis of servo data read out from the disk and a target position;
a noise elimination part to perform noise elimination processing of the position error signal;
a servo controller to generate, on the basis of the position error signal, the noise elimination processing of which has been performed by the noise elimination part, a servo control signal for controlling a position of the head; and
a driving signal generator to generate a driving signal for driving the drive unit on the basis of the servo control signal;
wherein said noise elimination part includes a plurality of noise elimination filters, each of which eliminates noise in each different frequency band, said noise elimination part executing the noise elimination processing of the position error signal by arbitrarily selecting one or two or more noise elimination filters from among the plurality of noise elimination filters.

13. A disk drive connected to other disk drives and host equipment, said disk drive including a disk, a head for writing data to the disk, and/or reading data from the disk, and a drive unit for driving the head, said disk drive comprising:
a vibration detector to detect vibrations;
a correction signal generator to generate a correction signal on the basis of the vibrations detected by the vibration detector;
a communication part to notify the host of the result of the generation by the correction signal generator;
a position error signal generator to generate a position error signal on the basis of servo data read out from the disk and a target position;
a servo controller to generate a servo control signal for controlling a position of the head on the basis of the position error signal; and
a driving signal generator to generate a driving signal for driving the drive unit on the basis of the correction signal and the servo control signal;
wherein said correction signal generator includes a plurality of filters, each of which eliminates vibrations in each different frequency band, said correction signal generator selecting one or two or more filters from among the plurality of filters when the vibrations are detected, and then generating the correction signal so as to reduce a position error indicated by the position error signal; and
wherein if the position error is reduced by the correction signal, said communication part transmits, to the host, filter information used by the correction signal generator, and then the host stores information about a surrounding environment at the time of receiving the filter information, and if nearly the same surrounding environment as that stored in the host is experienced next time, the filter information is transmitted from the host to the correction signal generator.

14. A disk drive according to claim 13, wherein:
when vibrations and/or a position error whose magnitude is a specified value or more occur, said correction signal generator generates the correction signal.

15. A disk drive according to claim 13, further comprising:
a noise elimination part to perform noise elimination processing of the position error signal,
wherein said servo controller generates the servo control signal on the basis of a position error signal, the noise elimination processing of which has been performed by the noise elimination part; and
wherein said noise elimination part includes a plurality of noise elimination filters, each of which eliminates noise in each different frequency band, said noise elimination part executing the noise elimination processing of the position error signal by selecting one or two or more noise elimination filters from among the plurality of noise elimination filters.

16. A disk drive according to claim 13, further comprising:
an error recovery processing part to perform error recovery processing of detected read and write errors on the basis of the servo data,
wherein when a read error or a write error occurs, said error recovery processing part instructs the correction signal generator to perform the filter selection so that the correction signal is generated.

17. A disk drive according to claim 13, wherein:
if the position error is not reduced even after said one or two or more filters are selected to generate the correction signal, said correction signal generator switches the filter to another to generate the correction signal.

18. A control method for controlling a disk drive, said disk drive including a disk, a head for writing data to the disk, and/or reading data from the disk, and a drive unit for driving the head, said method comprising:
generating a position error signal on the basis of servo data read out from the disk and a target position;
generating a servo control signal for controlling a position of the head on the basis of the position error signal;
on the basis of vibrations detected by a vibration detector for detecting vibrations, arbitrarily selecting one or two or more filters from among a plurality of filters, each of which is provided to eliminate vibrations in each different frequency band, and then generating the correction signal so as to reduce a position error indicated by the position error signal; and
generating a driving signal for driving the drive unit on the basis of the correction signal and the servo control signal.

19. A control method for controlling a disk drive, said disk drive including a disk, a head for writing data to the disk, and/or reading data from the disk, and a drive unit for driving the head, said method comprising:

generating a position error signal on the basis of servo data read out from the disk and a target position;

arbitrarily selecting one or two or more filters from among a plurality of filters, each of which is provided to eliminate vibrations in each different frequency band, and then executing noise elimination processing of the position error signal;

on the basis of the position error signal, the noise elimination processing of which has been performed, generating a servo control signal for controlling a position of the head; and generating a driving signal for driving the drive unit on the basis of the servo control signal.

* * * * *